US007245482B2

(12) United States Patent
Kim

(10) Patent No.: US 7,245,482 B2
(45) Date of Patent: Jul. 17, 2007

(54) PORTABLE COMPUTER WITH CAMERA

(75) Inventor: Hong-Sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/139,478

(22) Filed: May 31, 2005

(65) Prior Publication Data
US 2005/0276009 A1 Dec. 15, 2005

(30) Foreign Application Priority Data
Jun. 9, 2004 (KR) ...................... 10-2004-0042129

(51) Int. Cl.
H05K 5/02 (2006.01)
(52) U.S. Cl. ........................ 361/681; 345/156; D14/114
(58) Field of Classification Search ........ 361/679–687, 361/724–727; 348/207, 14.01; 345/156; D6/396, 397; D14/100, 114; 349/58
See application file for complete search history.

(56) References Cited
U.S. PATENT DOCUMENTS
5,053,804 A    10/1991  Odaka et al.
6,525,932 B1 *  2/2003  Ohnishi et al. ............. 361/686
6,590,764 B2 *  7/2003  Silverstein .................. 361/683
6,947,278 B2 *  9/2005  Agata et al. ................ 361/683
2002/0057334 A1 * 5/2002  Mukai et al. ............ 348/14.01

FOREIGN PATENT DOCUMENTS
| CN | 1479333      | 3/2004  |
| JP | 2001-298654  | 10/2001 |
| JP | 2002-123241  | 4/2002  |
| JP | 2002-358055  | 12/2002 |
| JP | 2003-233444  | 8/2003  |
| KR | 20-0256731   | 12/2001 |

* cited by examiner

Primary Examiner—Hung Van Duong
(74) Attorney, Agent, or Firm—Roylance, Abrams, Berdo & Goodman, LLP

(57) ABSTRACT

The present invention relates to a portable computer having a computer main body, and a display part rotatably coupled to the computer main body. The portable computer includes a camera module provided on one of the computer main body or the display part. A switch is provided in the camera module for turning the camera module on/off when the display part is rotated to an open/closed position.

13 Claims, 5 Drawing Sheets

PORTABLE COMPUTER WITH CAMERA

CROSS-REFERENCE TO RELATED APPLICATIONS

This application claims the benefit under 35 U.S.C. § 119(a) of Korean Patent Application No. 2004-0042129, entitled "Portable Computer with Camera Module," filed on Jun. 9, 2004, the entire disclosure of which is hereby incorporated by reference.

BACKGROUND OF THE INVENTION

1. Field of the Invention

The present invention relates to a portable computer. More particularly, the present invention relates to a portable computer with a camera on/off switch for conserving energy.

2. Description of the Related Art

Generally, a portable computer comprises a display part for displaying a picture thereon. Additionally, a computer main body for supporting the display part is provided with a plurality of hardware components. Portable computers include laptop computers, notebook computers, and palmtop computers, and the like.

Such portable computers can be detachably mounted with a camera capable of taking both moving pictures and photographs. The images can be used in a picture phone, visual chatting, a videoconference, and so on. Recently, progress has been made with portable computers having built-in cameras. The portable computer and the camera are integrally formed as a single body for convenience and low production cost. The built-in camera is driven for operation by a camera driver, that is, a program installed on the portable computer.

However, in conventional portable computers having built-in cameras, the camera is controlled for turning on/off only by the camera driver installed on the portable computer. Therefore, in the case where the camera is turned on by the camera driver, but is not in use, a user must check whether the camera is turned on or off. To do so, the user must use the camera driver to turn off the camera. Thus conventional portable computers having built-in cameras are inconvenient for a user to operate. Further, even though the camera is not in use, electric power is continuously supplied to the camera, and thus the camera wastefully consumes electric power.

Therefore, a need exists for a portable computer having an improved camera module with an on/off switch for conserving energy.

SUMMARY OF THE INVENTION

Accordingly, embodiments of the present invention provide a portable computer with a camera which is convenient for a user to operate and which conserves electrical power.

The foregoing and other objects are substantially realized by providing a portable computer having a computer main body and a display part rotatably coupled to the computer main body. The portable computer includes a camera module that is provided on one of the computer main body or the display part. A switch is provided in the camera module for turning the camera module on/off.

The camera module has a camera main body that is rotatably coupled to the display part and has a lens for photographing, and the switch is operated by the rotation of the camera main body.

The camera module also includes a camera base supporting the camera main body and is coupled to the display part.

A rotatable shaft is provided between the camera main body and the camera base to allow the camera main body to rotate with respect to the camera base.

The switch has a first contact terminal provided in the camera main body, and a second contact terminal provided in the camera base adapted to contact with the first contact terminal by the rotation of the camera main body.

The first contact terminal is in contact with the second contact terminal when the lens of the camera main body is rotated to face the camera base, and turns off the camera module.

A through hole is preferably formed in the rotatable shaft through which a cable connecting the camera main body with the camera base passes.

Other objects, advantages, and salient features of the invention will become apparent from the detailed description, which, taken in conjunction with the annexed drawings, discloses preferred embodiments of the invention.

BRIEF DESCRIPTION OF THE DRAWINGS

The above and other aspects, features, and advantages of certain embodiments of the present invention will be more apparent and more readily appreciated from the following detailed description taken with reference to the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
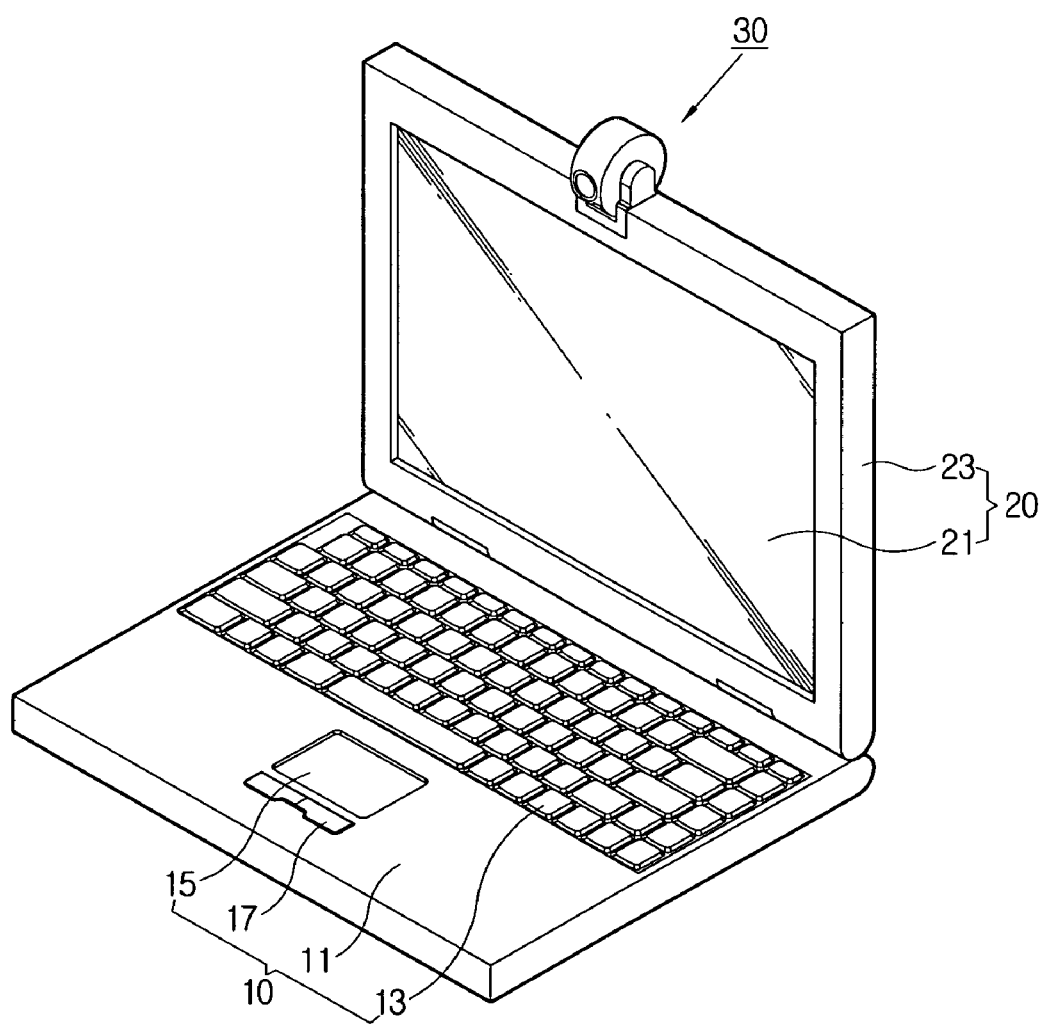
FIG. 1 is a perspective view of a portable computer in accordance with an embodiment of the present invention.
Figure 2:
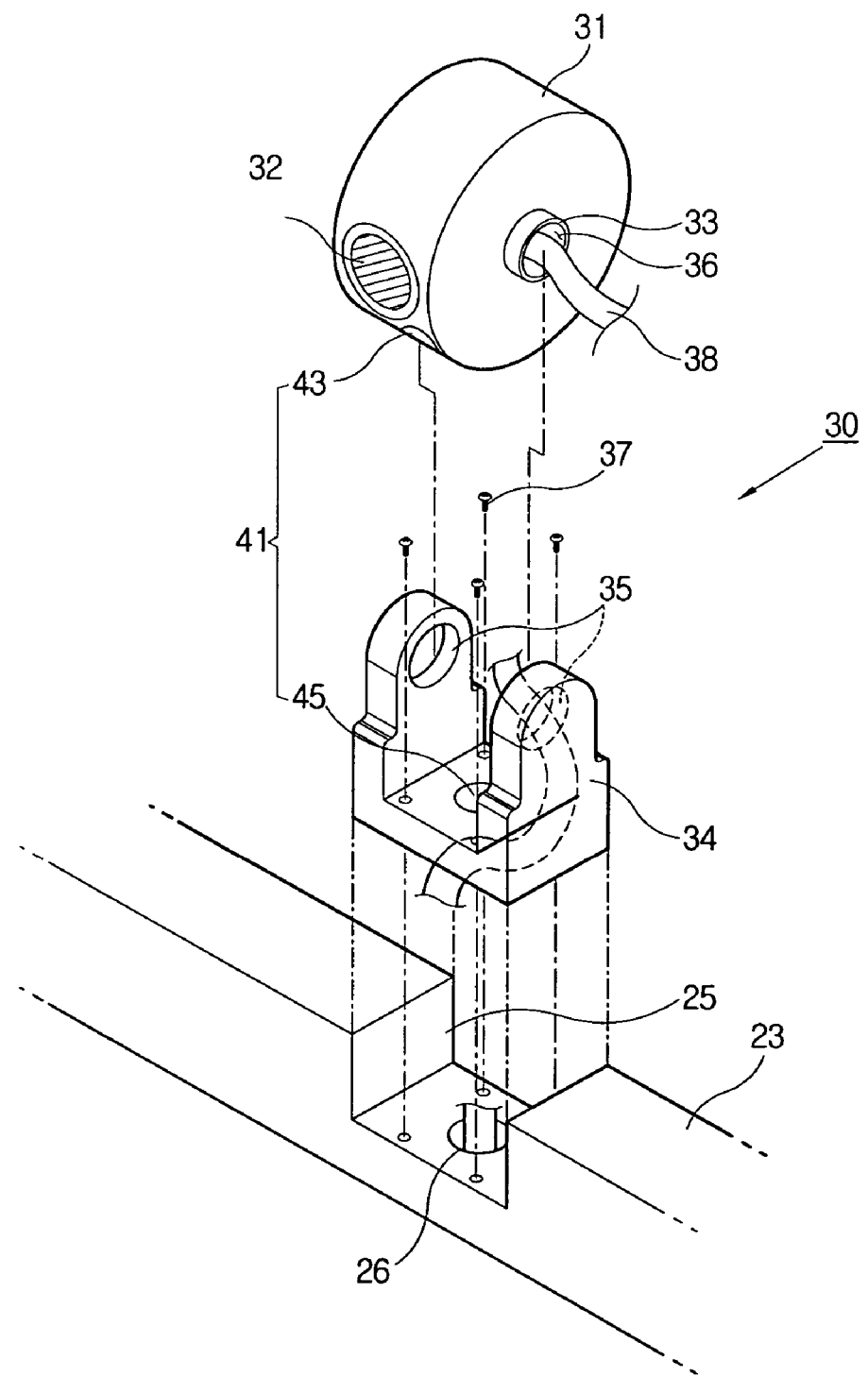
FIG. 2 is an exploded perspective view of a camera module in the portable computer of FIG. 1.
Figure 3:
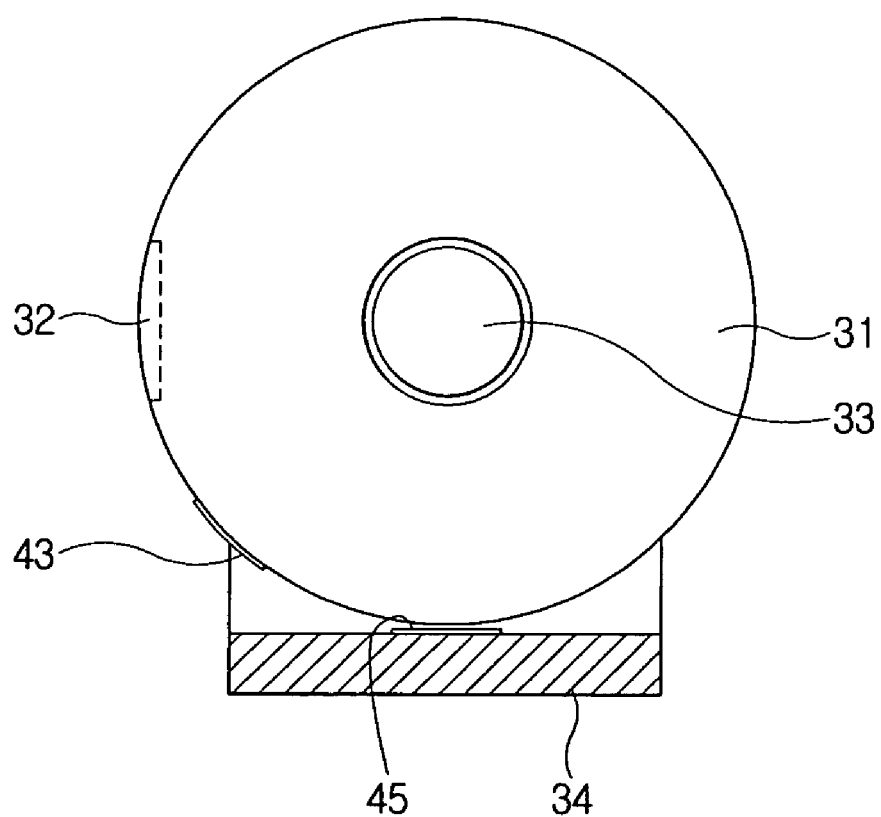
FIGS. 3 and 4 are views illustrating operations of the camera module in the portable computer of FIG. 1.
Figure 4:
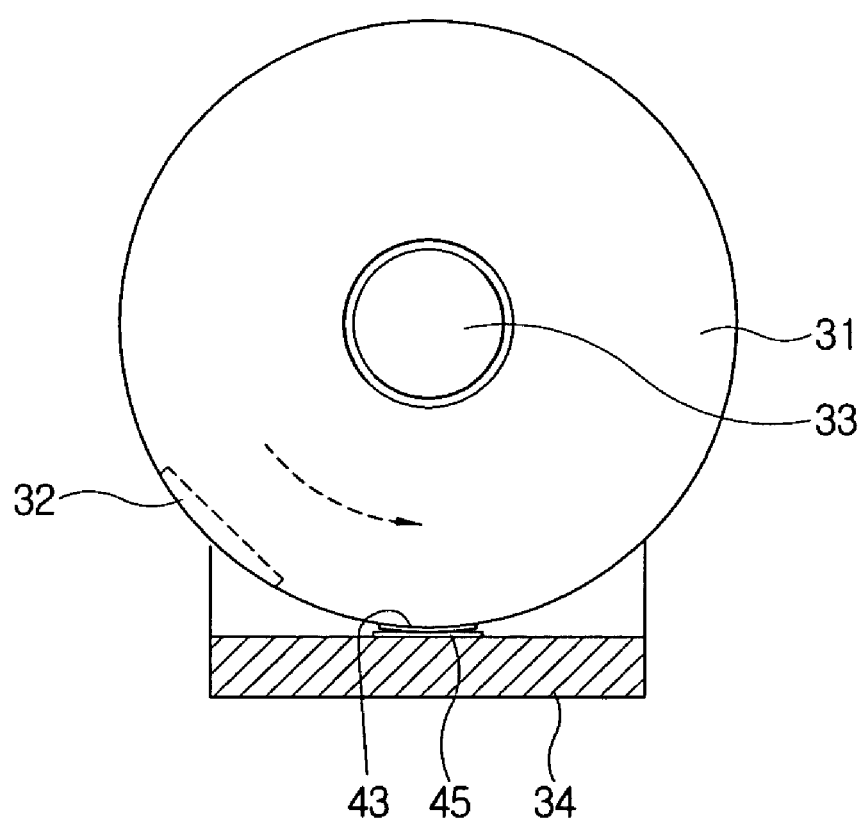

The matters defined in the description such as a detailed construction and elements thereof, are provided to assist in a comprehensive understanding of the embodiments of the invention. Accordingly, those of ordinary skill in the art will recognize that various changes and modifications of the embodiments described herein can be made without departing from the scope and spirit of the invention.

As shown in FIGS. 1 through 4, a portable computer 1 according to an embodiment of the present invention comprises a computer main body 10 mounted with a plurality of hardware components such as a central processing unit (CPU), and a display part 20 rotatably coupled with the computer main body 10. Further, the portable computer 1 according to an embodiment of the present invention comprises a camera module 30 mounted to either the computer main body 10 or the display part 20, and a switch 41 provided in the camera module 30 for turning on/off the camera module 30.

The computer main body 10 comprises a main casing 11 forming an outer surface A plurality of hardware components (not shown) are provided in the main casing 11 and accommodate a mother board (not shown) on which the CPU, a random access memory (RAM), etc. are mounted. Moreover, a keyboard 13 is used for inputting data.

On the main casing 11 a touch pad 15 is provided and used for moving a cursor point on a screen. A selection button 17 is disposed adjacent to the touch pad 15 and is used for performing selection pointed by the cursor point.

The display part 20 comprises a display panel 21, the display panel is preferably a thin film transistor-liquid crystal display (TFT-LCD) panel to receive a video signal from the computer main body 10 and display a picture thereon, and a display casing 23 to support the display panel 21.

The display casing 23 is formed with a camera coupling portion 25 to which the camera module 30 is mounted.

The camera coupling portion 25 is formed by recessing the display casing 23 for accommodating therein and for coupling a camera base 34 of the camera module 30 (to be described later). Further, the camera coupling portion 25 is placed on a top portion of the display casing 23 in the state that the display part 20 is opened at an approximately right angle to the computer main body 10. Alternatively, the camera coupling portion 25 may be placed on a side portion of the display casing 23 in the state that the display part 20 is opened at an approximately right angle to the computer main body 10.

The camera module 30 is rotatably coupled to the display part 20. The camera module 30 includes a camera main body 31 having a lens 32 for photographing. The camera module 30 comprises a camera base 34 for supporting the camera main body 31. The camera base 34 is fixedly coupled to the display part 20 for rotatably coupling the camera module 30 with the display part 20. A rotatable shaft portion 33 is provided between the camera main body 31 and the camera base 34 for allowing the camera main body 31 to rotate about the camera base 34.

The camera main body 31 comprises a lens 32 for taking moving pictures or photographs. According to an embodiment of the present invention, the camera main body 31 is substantially cylindrically shaped and rotates about the camera base 34. That is, a pair of rotatable shaft portions 33 of the camera main body 31 are rotatably inserted in a pair of shaft holders 35 of the camera base 34. However, the camera main body 31 is not limited to the cylindrical shape and may have various shapes such as rectangular shape, and so on.

The camera base 34 has a first portion inserted in the camera coupling portion 25 of the display part 20. The camera base 34 has a second portion rotatably coupled with the camera main body 31. That is, the first portion of the camera base 34 is inserted in the camera coupling portion 25 of the display part 20 and then coupled by a screw 37, and the second portion thereof is formed with the shaft holder 35 to which the rotatable shaft portion 33 is rotatably coupled. Alternatively, the camera base 34 may be coupled to the camera coupling portion 25 by an adhesive or other means. Preferably, the camera base 34 accommodates therein a cable 38 connecting the camera main body 31 with the computer main body 10. Accordingly, the camera coupling portion 25 is preferably formed with a through portion 26 through which the cable 38 passes.

Meanwhile, a rotatable angle restrictor (not shown) is further provided between the camera base 34 and the camera main body 31. The rotatable angle restricter limits a rotatable angle of the camera main body 31 relative to the camera base 34, which is well-known to those skilled in the art. According to an embodiment of the present invention, the rotatable angle restrictor comprises a protrusion (not shown) provided in the camera base 34. Additionally, a stopper (not shown) is provided in the camera main body 31 and stopped by the protrusion when the camera main body 31 is rotated at a predetermined angle to the camera base 34.

The pair of rotatable shaft portions 33 protrude from opposite sides of the camera main body 31. Preferably, at least one of the rotatable shaft portions 33 is formed with a through hole 36 through which the cable 38 connecting the camera main body 31 with the camera base 34 passes.

Switch 41 is provided in at least one of the camera main body 341 and the camera base 34 and is used for turning on/off the camera main body 31. Preferably, the switch 41 is interposed between the camera main body 31 and the camera base 34, and is operated by the rotation of the camera main body 31 relative to the camera base 34. For example, the switch 41 comprises a first contact terminal 43 provided in the camera main body 31, and a second contact terminal 45 provided in the camera base 34. The second contact terminal 45 contacts the first contact terminal 43 by the rotation of the camera main body 31. In this embodiment, the switch 41 turns off the camera main body 31 when the first contact terminal 43 is in contact with the second contact terminal 45. Alternatively, the switch 41 may turn on the camera main body 31 when the first contact terminal 43 is in contact with the second contact terminal 45.

When the camera main body 31 is rotated downward, and the lens 32 faces the camera base 34, the first contact terminal 43 is in contact with the second contact terminal 45. Thus, electric power supplied from a power supply 55 to the camera main body 31 is cut off. Alternatively, when the camera main body 31 is rotated upward, and the lens 32 is lifted from the camera base 34, the camera main body 31 is turned on.

The first contact terminal 43 is provided in an outer circumference of the camera main body 31 and connected to the cable 38. That is, the first contact terminal 43 is provided in a lower portion of the lens 32 and contacts the second contact terminal 45 when the lens 32 is rotated to face the camera base 34. Alternatively, the first contact terminal 43 may be provided in a side portion of the camera main body 31 at which the rotatable shaft portion 33 is provided. Further, the first contact terminal 43 may contact the second contact terminal 45 when the lens 32 is rotated to have an angle to the camera base 34 without facing the camera base 34. For example, when the lens 32 is rotated upward or backward with respect to FIG. 1.

The second contact terminal 45, according to an embodiment of the present invention, is provided in the camera base 34 and is contactable with the first contact terminal 43. That is, the second contact terminal 45 is provided under the lens 32 of the camera main body 31 and contacts the first contact terminal 43 when the lens 32 is rotated to face the camera base 34. Alternatively, the second contact terminal 45 may contact the first contact terminal 43 when the lens 32 is rotated to have an angle to the camera base 34 without facing the camera base 34. For example, when the lens 32 is rotated upward or backward with respect to FIG. 1.

Figure 5:
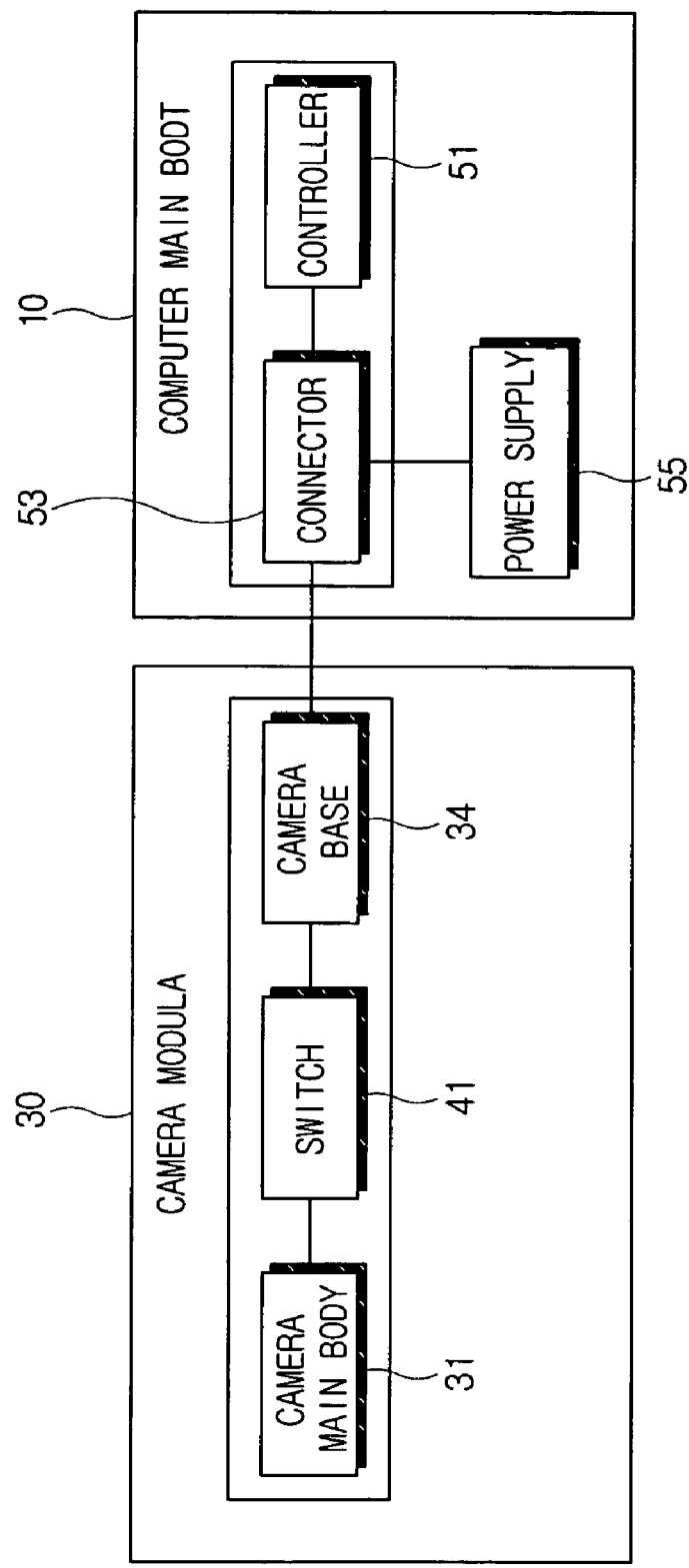
FIG. 5 is a control block diagram of the camera module of the portable computer according to an embodiment of the present invention.

FIG. 5 is a control block diagram of the camera module of the portable computer according to an embodiment of the present invention. As shown therein, the camera module 30 is connected to and controlled by a controller 51 provided in the computer main body 10. That is, the camera module 30 is connected to the controller 51 by the cable through a connector 53 mounted on the mother board (not shown) of the computer main body 10. Further, the camera module 30 and the controller 51 receive the electric power from the power supply 55 provided in the computer main body 10. That is, the power supply 55 is connected to both the camera module 30 and the controller 51 through the connector 53.

The controller 51 may include a digital signal processor (DSP) to process a signal transmitted from the camera module 30 into a video signal, and a USB interface or IEEE1394 interface to transmit the processed video signal to the display part 20 or other display devices. Further, the controller 51 is controlled by a camera driver program and controls the camera module 30 to operate or for turning the camera module on/off.

With this configuration, the camera module 30 of the portable computer 1 according to an embodiment of the present invention is operated as follows.

First, the electric power is supplied to the computer main body 10 and turns on the portable computer 1. Then, the camera driver program is executed to turn on the camera module 30. At this time, the camera module 30 is allowed to take moving pictures or photographs.

In the case where the camera module 30 is not in use, a user rotates the camera main body 31 to contact the first contact terminal 43 with the second contact terminal 45, thus operating the switch 41 that turns off the camera module 30. That is, the lens 32 of the camera main body 31 is rotated to face the camera base 34, so that the first contact terminal 43 is in contact with the second contact terminal 45, thereby cutting off the electric power supplied from the power supply 55 to the camera main body 31. Thus, a user can easily check whether the camera is turned on or off by checking the position of the lens 32, and easily turn off the camera module 30 by rotating the camera main body 31. Consequently, the camera module 30 is easily turned off, thereby conserving electric power.

Meanwhile, to use the camera module 30, a user rotates the lens 32 of the camera main body 31 to have an angle to the camera base 34 without facing the camera base 34, so that the electric power is supplied to the camera main body 31. Thus, the camera main body 31 is allowed to operate.

In the foregoing embodiment, the camera module 30 comprises the camera base 34 to support the camera main body 31. Alternatively, the camera main body 31 may be directly and rotatably coupled to the camera coupling portion 25 without the camera base.

As described above, the present invention provides a portable computer comprises a camera module 30 provided either on a computer main body 10 or a display part 20, and a switch 41 is provided in the camera module 30 for turning on/off the camera module 30. The camera module 30 is convenient for a user to use and conserves electric power.

While the invention has been shown and described with reference to certain embodiments thereof, it will be understood by those skilled in the art that various changes in form and details may be made therein without departing from the spirit and scope of the invention as defined by the appended claims.

What is claimed is:

1. A portable computer comprising a computer main body, and a display part rotatably coupled to the computer main body, the portable computer comprising:
   a camera module provided on one of the computer main body and the display part; and
   a switch for turning the camera module on/off, the switch comprising a first contact terminal provided in a camera main body, and a second contact terminal provided in a camera base adapted to contact the first contact terminal by the rotation of the camera main body.

2. The portable computer according to claim 1, wherein the camera module comprises a camera main body that is rotatably coupled to the display part, and a lens for photographing, and whereby the switch is operated by the rotation of the camera main body.

3. The portable computer according to claim 1, wherein the first contact terminal is in contact with the second contact terminal when the lens of the camera main body is rotated to face the camera base, and turns off the camera module.

4. The portable computer according to claim 2, wherein the camera module further comprises:
   the camera base that supports the camera main body and is coupled to the display part; and
   a rotatable shaft provided between the camera main body and the camera base to allow the camera main body to rotate with respect to the camera base.

5. The portable computer according to claim 3, wherein the camera module turns off when the first contact terminal contacts the second contact terminal.

6. The portable computer according to claim 4, wherein a through hole is formed in the rotatable shaft and a cable connecting the camera main body with the camera base passes therethrough.

7. A portable computer comprising a computer main body, and a display part rotatably coupled to the computer main body, the portable computer comprising:
   a camera module provided on one of the computer main body and the display part the camera module comprising a camera main body that is rotatably coupled to the display part, and a lens for photographing; and
   a switch provided in the camera module for turning the camera module the switch comprising a first contact terminal provided in the camera main body, and a second contact terminal provided in a camera base adapted to contact the first contact terminal by rotation of the camera main body;
   whereby the switch is operated by rotation of the camera main body.

8. The portable computer according to claim 7, wherein the camera module further comprises:
   the camera base that supports the camera main body and is coupled to the display part; and
   a rotatable shaft provided between the camera main body and the camera base to allow the camera main body to rotate with respect to the camera base.

9. The portable computer according to claim 7, wherein the first contact terminal is in contact with the second contact terminal when the lens of the camera main body is rotated to face the camera base and turns off the camera module.

10. The portable computer according to claim 8, wherein a through hole is formed in the rotatable shaft and a cable connecting the camera main body with the camera base passes therethrough.

11. The portable computer according to claim 9, wherein the camera module turns off when the first contact terminal contacts the second contact terminal.

12. A portable computer comprising a computer main body, and a display part rotatably coupled to the computer main body, the portable computer comprising:
   a camera module provided on one of the computer main body and the display part, the camera module having a camera main body that is rotatably coupled to the display part, and a lens for photographing;
   a switch provided in the camera module for turning the camera module on/off;
   a camera base that supports the camera main body and is coupled to the display part; and
   a rotatable shaft provided between the camera main body and the camera base to allow the camera main body to rotate with respect to the camera base, the rotatable shaft having a through hole for passing a cable connecting the camera main body with the camera base therethrough.

13. The portable terminal according to claim 12, wherein the switch comprises a first contact terminal provided in the camera main body and a second contact terminal provided in the camera base adapted to contact with the first contact terminal by rotation of the camera main body.

* * * * *